United States Patent [19]
Meritt

[11] Patent Number: 6,092,705
[45] Date of Patent: Jul. 25, 2000

[54] SELF-CONTAINED CASE FOR HOUSING TRANSPORTING AND MOUNTING VIDEO MONITOR AND VIDEO PLAYER FOR USE IN PASSENGER VEHICLES

[76] Inventor: Ronald R. Meritt, 679 Avenidia De Diamante, Arroyo Grande, Calif. 93420

[21] Appl. No.: 09/236,743

[22] Filed: Jan. 25, 1999

Related U.S. Application Data

[60] Provisional application No. 60/095,191, Aug. 3, 1998.

[51] Int. Cl.[7] ............................. B60R 11/02; B60R 7/04
[52] U.S. Cl. ...................... 224/275; 224/929; 296/37.15; 296/37.16; 297/188.06; 297/188.07; 297/188.2; 273/148 B; 463/46; 463/47; 348/837
[58] Field of Search ..................... 224/275, 539, 224/543, 563, 572, 929; 348/837; 190/110; 273/148 B; 297/188.04, 188.05, 188.06, 188.07, 188.2, 188.21; 463/46, 47; 296/37.6, 37.15, 37.16; 206/287.1; 135/911

[56] References Cited

U.S. PATENT DOCUMENTS

| | | |
|---|---|---|
| 2,261,291 | 11/1941 | Salvasky ............................ 190/110 X |
| 2,853,219 | 9/1958 | Schwartz . |
| 3,690,446 | 9/1972 | Spainhour .......................... 224/275 X |
| 4,383,626 | 5/1983 | Weinblatt . |
| 4,506,769 | 3/1985 | Franco et al. ....................... 190/110 X |
| 4,580,667 | 4/1986 | Herwood ................................. 190/110 |
| 4,585,196 | 4/1986 | Cormier . |
| 4,635,110 | 1/1987 | Weinblatt ................................ 348/837 |
| 4,658,956 | 4/1987 | Takeda et al. .................. 273/148 B X |
| 4,673,070 | 6/1987 | Ambal ................................ 190/110 X |
| 4,756,528 | 7/1988 | Umashankar . |
| 4,843,477 | 6/1989 | Mizutani et al. . |
| 4,982,996 | 1/1991 | Vottero-Fin et al. . |
| 5,177,616 | 1/1993 | Riday . |
| 5,226,576 | 7/1993 | Ellsworth ................................ 224/572 |
| 5,330,049 | 7/1994 | Bertelsen et al. ...................... 206/279 |
| 5,338,081 | 8/1994 | Young et al. . |
| 5,555,466 | 9/1996 | Scribner et al. . |
| 5,725,189 | 3/1998 | Landy . |
| 5,898,294 | 2/1999 | Webster ................................. 224/275 |

*Primary Examiner*—Gregory M. Vidovich
*Attorney, Agent, or Firm*—Akin, Gump, Strauss, Hauer & Feld, L.L.P.

[57] ABSTRACT

A mounting system which releasably and securely mount an entertainment accessory within an automobile. The automobile has first and second headrests extending from at least one seat and an internal floor. The mounting system comprises a first case for receiving the entertainment accessory and a first quick connect device for releasably securing the first case to the internal floor and at least one of the first and second headrests.

4 Claims, 7 Drawing Sheets

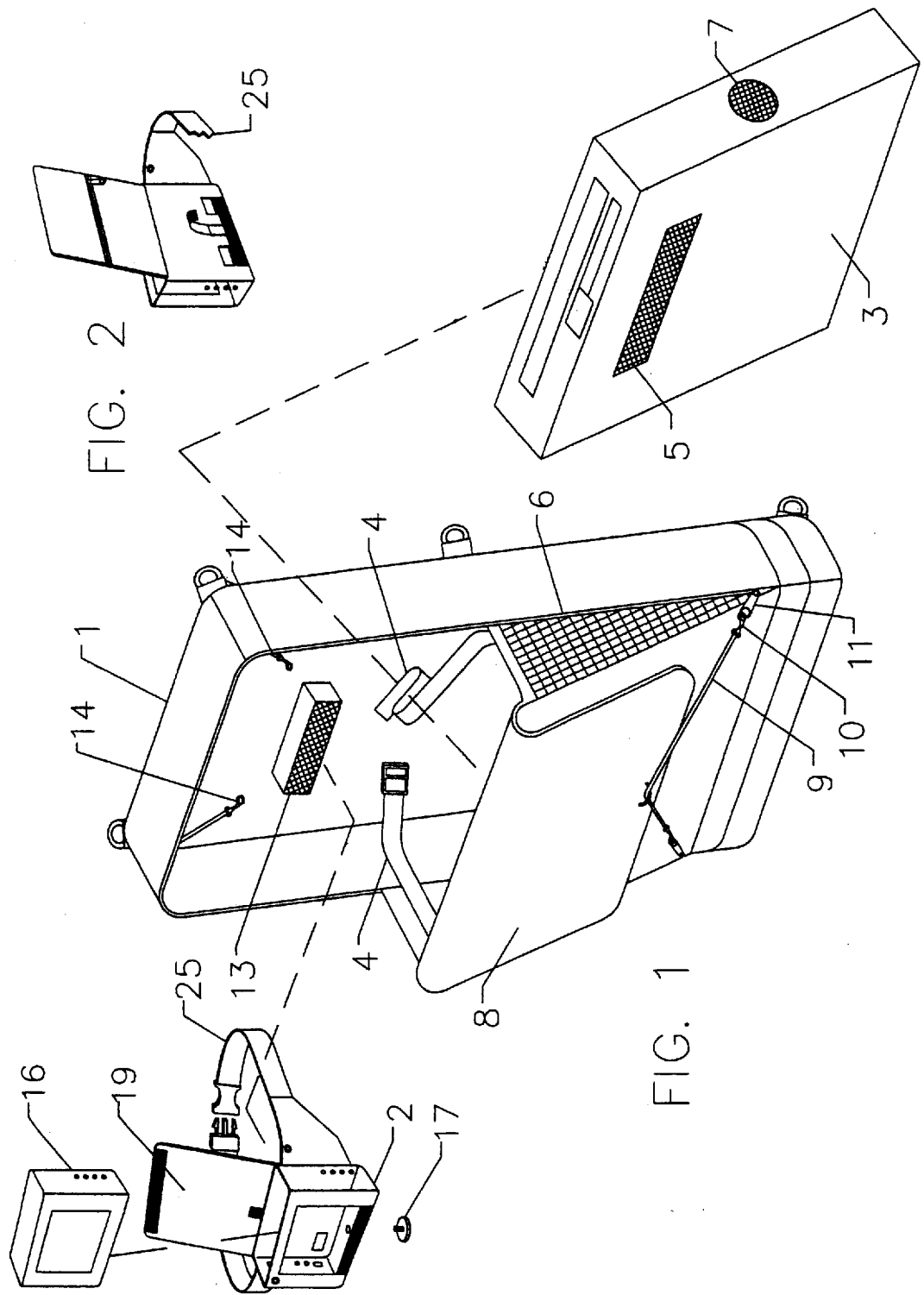

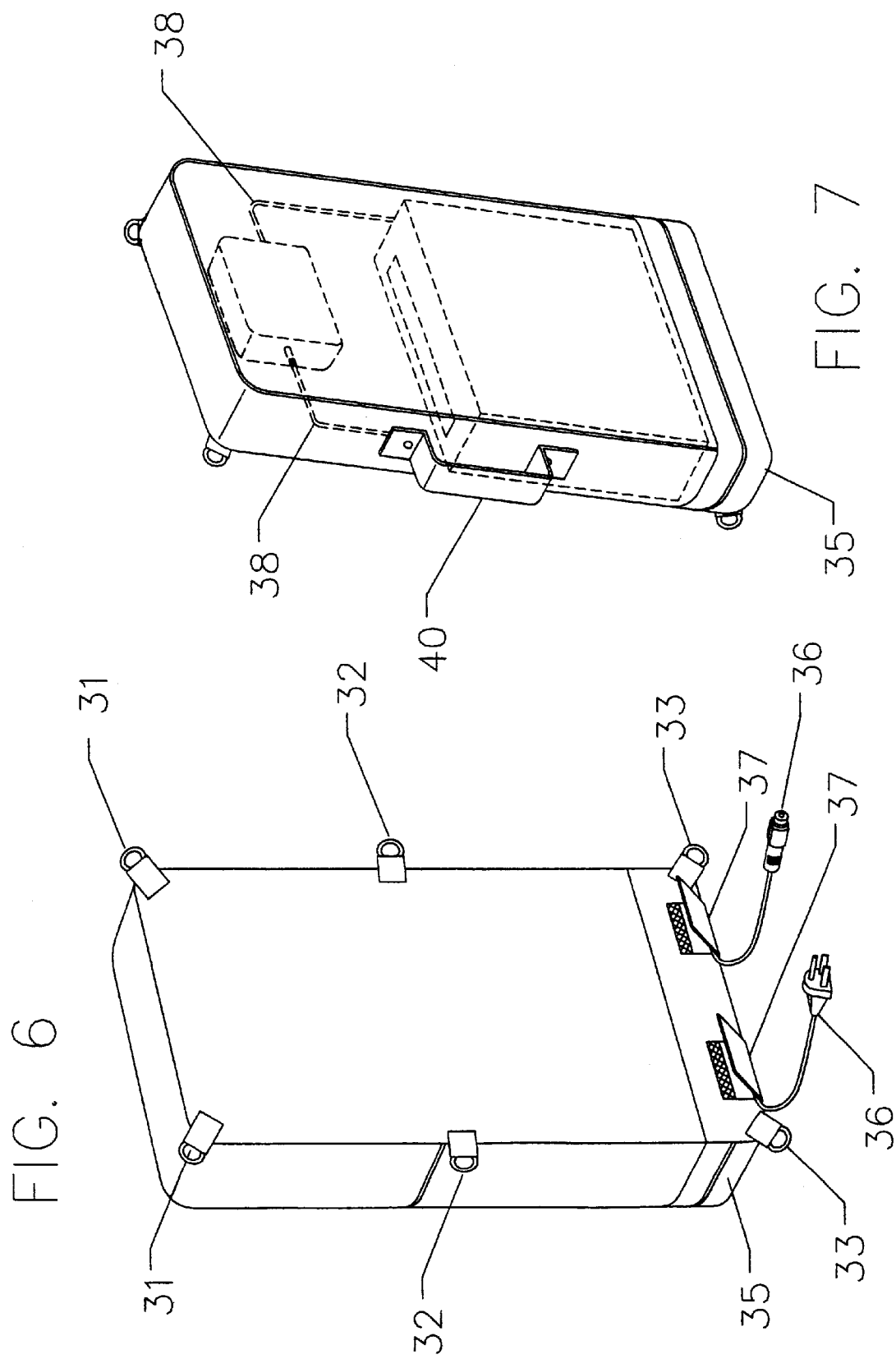

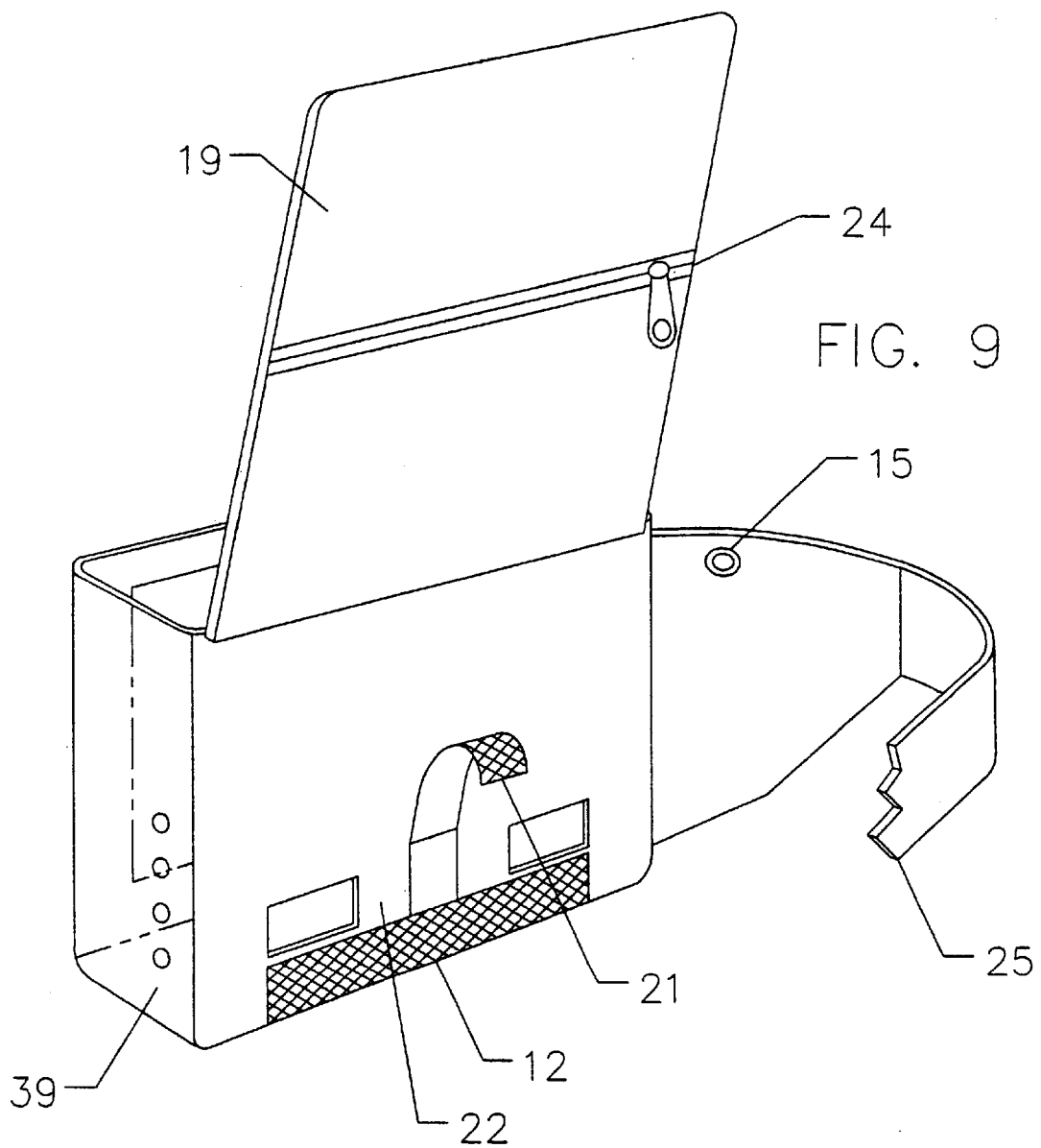

SELF-CONTAINED CASE FOR HOUSING TRANSPORTING AND MOUNTING VIDEO MONITOR AND VIDEO PLAYER FOR USE IN PASSENGER VEHICLES

CROSS REFERENCE TO RELATED APPLICATION

This application claims priority, under 35 U.S.C. § 119(e), to U.S. Provisional Application No. 60/095,191 filed on Aug. 3, 1998, entitled Universally Adjustable Harness for Video Monitor and Video Player for use in Passenger Vehicles, which is incorporated herein by reference in its entirety.

BACKGROUND OF THE INVENTION

This invention relates to consumer electronics for use in automobiles and, more specifically, to a mounting system for temporarily, safely and securely installing a display device and an electronic signal generating device in an automobile.

There are two basic types of electronic equipment that are used with automobiles, fixed electronics and portable electronics. Fixed electronics may include video players and monitors that are installed in floor mounted consoles, overhead consoles, and inside of seat backs. Portable electronics are generally televisions and video players that are designed to operate using the accessory 12 volt direct current outlet (typically a cigarette lighter) that is generally provided in automobiles. Unfortunately, these products are not generally able to be securely mounted to the interior of an automobile. This can create a life threatening hazard, as improperly securing portable electronics in an automobile can result in secondary collisions in the event of an accident.

Various devices have been developed for use with consumer electronics and automobiles. For example, Landy (U.S. Pat. No. 5,725,189) shows a floor mounted device which accommodates only a CRT or combination TV/VCR, with no provision for mounting a stand-alone VCR. There is no means of securing this device to the interior of the automobile. The present invention is a padded fabric case which houses a stand-alone video player and another padded fabric case housing a LCD TV. The large case is mounted to the backside center of the two front seats and secures to the automobile by means of four adjustable straps.

Young, et al. (U.S. Pat. No. 5,338,081) show a multi-purpose storage device which requires removal of the front seat and only mounts in limited types of automobiles. Young states that it is possible to "conveniently store" electronic devices such as tape or audio disk players, however, there are no specific accommodations for mounting these electronic devices. The present invention does not require the removal of a automobile seat and can accommodate both LCD and CRT TV's.

Cormier (U.S. Pat. No. 4,585,196) shows a rigid mounting device which only accommodates a CRT TV or combination TV/VCR. Cormier shows two possible methods of attachment. The first method shows the device mounted over a seat, with two rigid panels covering both the front and back of the seat. This makes the front seat unusable. The second method shows the device mounted over the center armrest of the front seat. Because the arm rest is designed to fold forward and the heavy CRT TV is mounted high this a potential safety issue. The present invention is a padded fabric case as opposed to Corer's rigid frame. The present invention securely mounts to the automobile and has a much lower center of gravity providing a higher level of safety.

Weinblatt (U.S. Pat. No. 4,383,626) shows a rigid mounting device. The device is mounted over a seat, with two rigid panels covering both the front and back of the seat. This makes the front seat unusable. The Weinblatt device also has a platform with two squared edges that are at head level to the driver and front passenger, raising safety concerns. The present invention uses a padded fabric case as opposed to Weinblatt's rigid frame. The present invention securely mounts to backside of the front seat and has a much lower center of gravity providing a higher level of safety.

Scriber, et al. (U.S. Pat. No. 5,555,466) show a permanently installed built-in device that is neither portable or removable as is the present invention. The TV's are permanently installed into the center backside of the front seats. The TV of the present invention can be installed in the center of the two front seats or on the backside of any headrest in the automobile.

Riday (U.S. Pat. No. 5,177,616) shows a permanently mounted TV attached to the console via a rigid hinged mounting arm. There are no accommodations for a VCR or rear seat viewing as in the present invention. The present invention is portable and accommodates viewing in the rear seat.

Vottero-Fin, et al. (U.S. Pat. No. 4,982,996) show a permanently installed rigid device which only accommodates a CRT TV. The Vottero-Fin device is mounted between the two front seats. The present invention is a portable soft case device which accommodates both CRT and LCD TV's. The present invention is mounted to the backside center of the two front seats and secures to the automobile by means of four adjustable straps.

The present invention provides a mounting system for portable electronics that is capable of easily, releasably, and safely securing a display device and an electronic signal generating device inside a automobile. Thus overcoming the limitations of devices of the contemporary art, discussed above, that either permanently mount inside the automobile or that are designed for combination televisions and video cassette recorders that are not designed for use in moving automobiles. The mounting system of the present invention is designed to facilitate the use of display devices with electronic signal generating devices to entertain passengers in a automobile.

The mounting system uses a self contained case to securely house the display device, the electronic signal generating device, and the associated accessories. The display device is mounted in a small case which can either be positioned inside a larger case or directly mounted to the back of a seat. The first case is releasably attached to the automobile and also functions as a storage and carrying case. The present invention provides a maximum level of safety for users. Each component is secured to prevent injury in the event of an accident.

SUMMARY OF THE INVENTION

There are two basic types of video equipment for use in a motor vehicle, fixed and removable. The fixed units include video players and monitors installed in floor mounted consoles, overhead consoles, and mounted into the seat backs and headrests. The removable type units are combination television and video players designed to operate off the accessory 12 VDC outlet provided in passenger vehicles. Unfortunately, these products are not equipped with a means to mount the device to the interior of the vehicle. This can be hazardous in the event of an accident. The invention defined in this application is a means for safely mounting and securing the video cassette players (VCP) and TV/Monitors.

This invention is comprised of two individual cases which house video components and a means for attaching the cases inside a vehicle. The smaller case, hereinafter referred to as the TV/Monitor case, houses the TV/Monitor. The larger case, hereinafter referred to as the principle case, houses the video player, TV/Monitor within the TV/Monitor case, all electrical cables and power supplies, mounting straps, and accessories. The principle case serves as the carrying case and mounting platform for all said electrical components.

The principle case houses the TV/Monitor, video player, and electrical cables and accessories. The video player is secured inside the principle case by means of a nylon strap, which is wrapped around the bodies of the video player. The nylon strap is attached to the video player with an adjustable strap and hook and loop fastener. One side of the hook and loop fasteners is sewn to the nylon strap. The mating side of the hook and loop fastener is connected to the body of the video player with high strength and temperature adhesive. By using these adjustable straps, this device can accommodate many different sizes and shapes of video players.

The video player is positioned upright and attached to the inside of the zippered front cover of the principle case. Unzipping the zippers allows the front cover of the principle case to extend forward approximately 15 degrees exposing the front control panel of the video player. Extending the video player exposes air vents on the top and sides of the video player. The extension of the front cover of the principle case is limited by side panels. The side panels are comprised of mesh material which allow air flow to the side air vents of the video player. When operating the video player the front cover is folded back and secured with an elastic cord which is fed through a metal ring on the front cover. The elastic cord has a metal quick release fastener at each end which are attached to the left and right front cover zipper handles.

The TV/Monitor and video player are electronically connected to each other with a power cable and video cable. The cables are routed from the bottom of the video player, up the inside left and right sides of the principle case, through two elastic straps and into the TV/Monitor. The power cables, AC adapter, and mounting straps are stored in a zippered storage area in the bottom of the principle case. The power cables exit the principle case storage section through one of two flap-covered openings which are held closed with hoop and loop fasteners.

The principle case is mounted to the backside of a seat in the passenger section of a vehicle. The principle case installation is achieved by utilizing four identical adjustable nylon straps. The straps are comprised of a metal S hook, a metal quick release fastener, and an adjustable buckle. Two of these straps are used to attach the top of the case to the headrests, and the other two straps are used to secure the bottom of the case to the seat rails. The principle case has an upper, middle, and lower metal ring on either side, to which the upper and lower straps are connected. The right side of the case is mounted to the seat by attaching the metal quick disconnect end of a mounting strap to the upper right metal ring of the principle case. It is looped around the headrest, and the S hook end is attached to the middle metal ring of the principle case. Another strap secures the lower section of the principle case by attaching the metal quick release to the lower right metal ring and the S hook to the seat rail. The left side of the case is attached similarly. All straps are then tightened by utilizing the adjustable buckle.

The bottom of the principle case has a zippered storage compartment that houses the AC Adapter, AC and DC power cables, and video cables. This compartment also provides a storage area for the mounting straps when not in use. The power cables (AC and DC) exit the storage compartment through one of two flap-covered openings in the rear of the storage compartment. The power and video cables connecting the VCP and TV/Monitor run up and down both sides of the principle case.

The TV/Monitor case serves two purposes and may be mounted inside the principle case or on the rear of a headrest. This case is comprised of padded nylon enclosure that envelops the body of the LCD television. The LCD television is secured inside the TV/Monitor case by means of a threaded bolt that is fed through a metal grommet in the bottom of the enclosure. The bolt is threaded into a hole in the bottom of the LCD television that is designed to accommodate a mounting device. The LCD television is further secured inside the TV/Monitor case by means of elastic straps and hook and loop fasteners. The elastic strap is arranged horizontally and is sewn at both ends inside the back panel of the enclosure. The spring loaded support stand on the back of the LCD television is fed through the elastic strap for support. The LCD television is further secured inside the TV/Monitor case by means of hook and loop fasteners which are sewn into the back panel of the TV/Monitor case and attached to the LCD television with adhesives.

The TV/Monitor case is mounted inside the principle case by means of two metal grommets and two metal quick release fasteners. The two metal grommets are located on the left and right sides of the TV/Monitor case securing straps. The metal quick release fasteners are mounted to the inside upper left and right corners of the principle case. The upper section of the TV/Monitor case is secured to the primary case by inserting the metal quick release fasteners into the metal grommets of the TV/Monitor case. The lower section of the TV/Monitor case is secured to the primary case by means of a spacer block and hook and loop fasteners. The purpose of the spacer block is to modify the viewing angle of the TV screen to compensate for the angle of the seat back to which the principle case is attached. The spacer block is comprised of a rectangular foam block encased in a nylon zippered enclosure. The zipper allows the installation of various sized blocks to adjust the viewing angle. The TV/Monitor case is attached to the spacer block by means of a hook and loop fastener, and the spacer block is attached to the principle case by means of a hook and loop fastener.

The TV/Monitor case may also be attached to the back of a headrest by means of adjustable straps that are wrapped around the headrest and secured with a quick release fastener. The straps are sewn to the ends of the enclosure. The tension of the straps are adjusted by means of a tensioning buckle integrated into one of the straps.

Briefly stated, the present invention is directed to a mounting system for releasably and securely mounting an entertainment accessory within an automobile for providing electronically generated images viewable by a person in the automobile. The automobile has first and second headrests extending from at least one seat and has an internal floor. The mounting system includes an entertainment accessory. A first case has the entertainment accessory positioned therein by a first element and the first case has a first panel attached proximate to a first edge of the first case. The first panel is outwardly movable to access the entertainment accessory by the person in the automobile. The front panel being capable of covering an upper portion and a lower portion of the first case. A first quick connect device is attached to the first case and is adapted to releasably secure the first case to the automobile. The first quick connect device being releasably connected to a location proximate to the internal floor and to both of the first and second headrests.

The present invention is alternatively directed to a mounting system for releasably and securely mounting an electronic signal generating device and a display device within an automobile for providing electronically generated images viewable by a person in the automobile. The automobile has first and second headrests extending from at least one seat and has an internal floor. The mounting system includes a first case having an upper portion, a lower portion, and a first panel attached proximate to a first edge of the first case. A display device is positioned in the upper portion of the first case by a first element. An electronic signal generating device is positioned in the lower portion of the first case and is outwardly movable to access the electronic signal generating device by the person in the automobile. A first quick connect device is attached to the first case and is adapted to releasably secure the first case to the automobile. The first quick connect device is releasably connected to a location proximate to the internal floor and to both of the first and second headrests.

The present invention is also alternatively directed to a system for mounting a video player and a monitor generally behind at least one seat in an automobile to allow a person in the automobile to watch images on the monitor. The automobile has first and second headrests extending from the at least one seat and has an internal floor. The system includes a soft pack case having a compartment and having a first panel at least partially attachable to the soft pack case by a zipper to permit access to the compartment. A video player is positioned in the compartment and is capable of generating video signals. A monitor is positioned in the compartment by a first element and is capable of receiving video signals from the video player. The first panel of the soft pack case is outwardly movable to access the video player and to view the monitor. A strapping system is attached to the soft pack case. The strapping system is releasably attachable to the first and second headrests extending from the at least one seat and is releasably attachable to a location proximate to the internal floor.

BRIEF DESCRIPTION OF THE DRAWINGS

The foregoing summary, as well as the following detailed description of preferred embodiment of the invention, will be better understood when read in conjunction with the appended drawings. For the purpose of illustrating the invention, there is shown in the drawings an embodiment which is presently preferred. It is understood, however, that the invention is not limited to the precise arrangement and instrumentality shown. In the drawings:

FIG. 1 is an exploded front perspective view of a mounting system for releasably and securely mounting an entertainment accessory within an automobile in accordance with the present invention;

FIG. 2 is a rear perspective view, partially broken away, of a portion of the mounting system shown in FIG. 1;

FIG. 6 a rear perspective view of the mounting system shown in FIG. 1 in the closed position;

FIG. 7 is a front perspective view of the mounting system shown in FIG. 1 in the closed position;

FIG. 9 is a greatly enlarged view of FIG. 2.

DETAILED DESCRIPTION OF THE INVENTION

Figure 3:
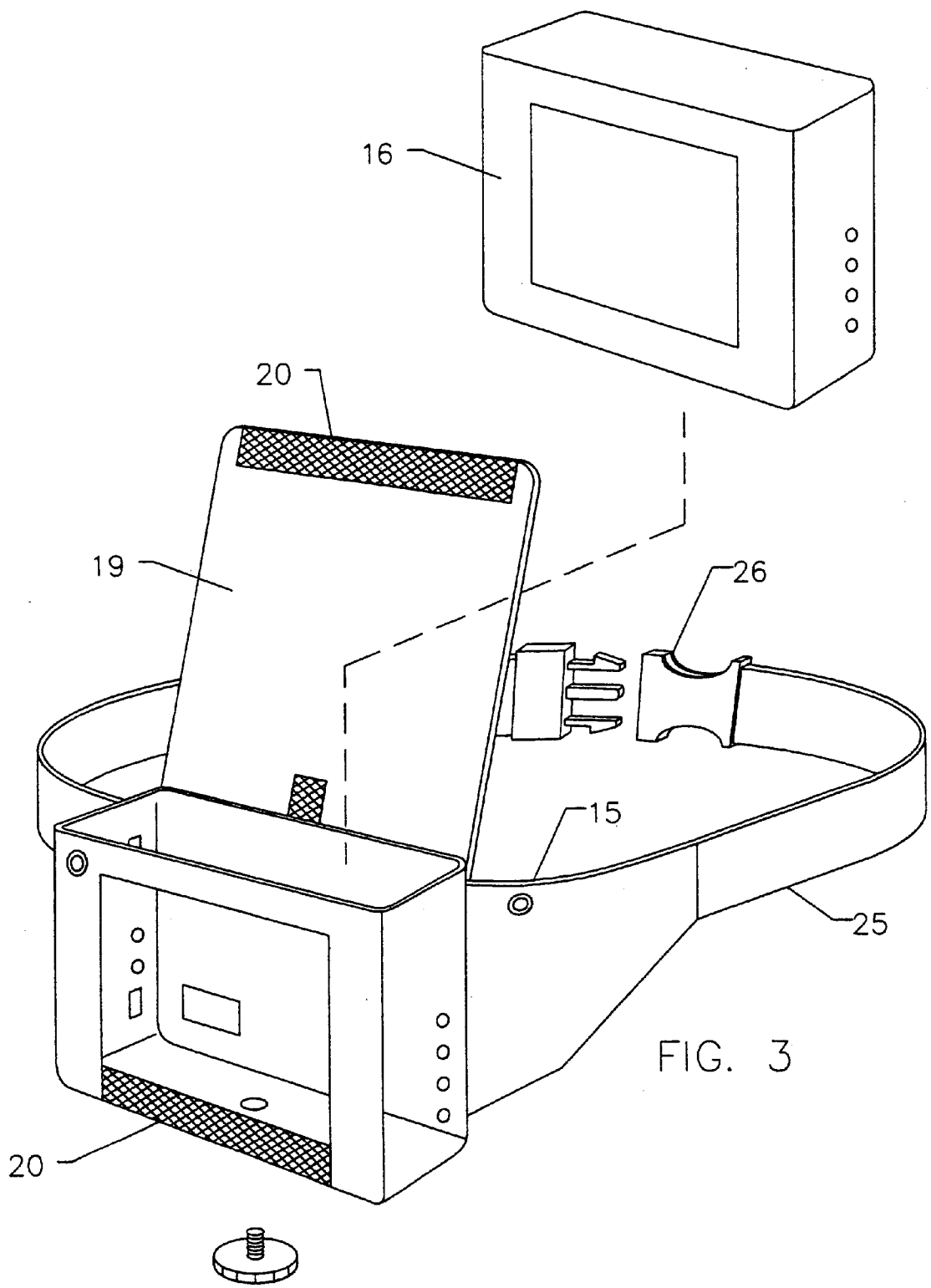
FIG. 3 is a rear perspective view of a portion of the mounting system of FIG. 1.

FIGS. 1–9 show perspective views of the component parts of the invention. FIG. 1 illustrates the principle case and its components. In FIG. 1, the principle case is in an open mode with the front cover, or first panel, extended, folded back and secured. The VCP, or electronic signal generating devices, (3) is secured inside a lower portion of the principle case (1) by means of the nylon straps (4) and a hook and loop fastener (5). The VCP is further secured by the mesh side panel (6) which accommodates air flow to the VCP cooling vents (7). The front cover (8) is folded and held in place by an elastic strap (9) which has metal quick release fasteners (10) at either end. These quick release fasteners are attached to the zipper handles (11). The TV/Monitor case (2) is attached to the principle case by means of a hook and loop fastener (12) at the rear of the case which mates to a hook and loop fastener on the spacer block (13). The TV/Monitor, or display device, is fuirther secured to the principle case by attaching two metal quick release fasteners (14) which are located inside the principle case, to two metal grommets (15) on each side of the TV/Monitor case.

Figure 4:
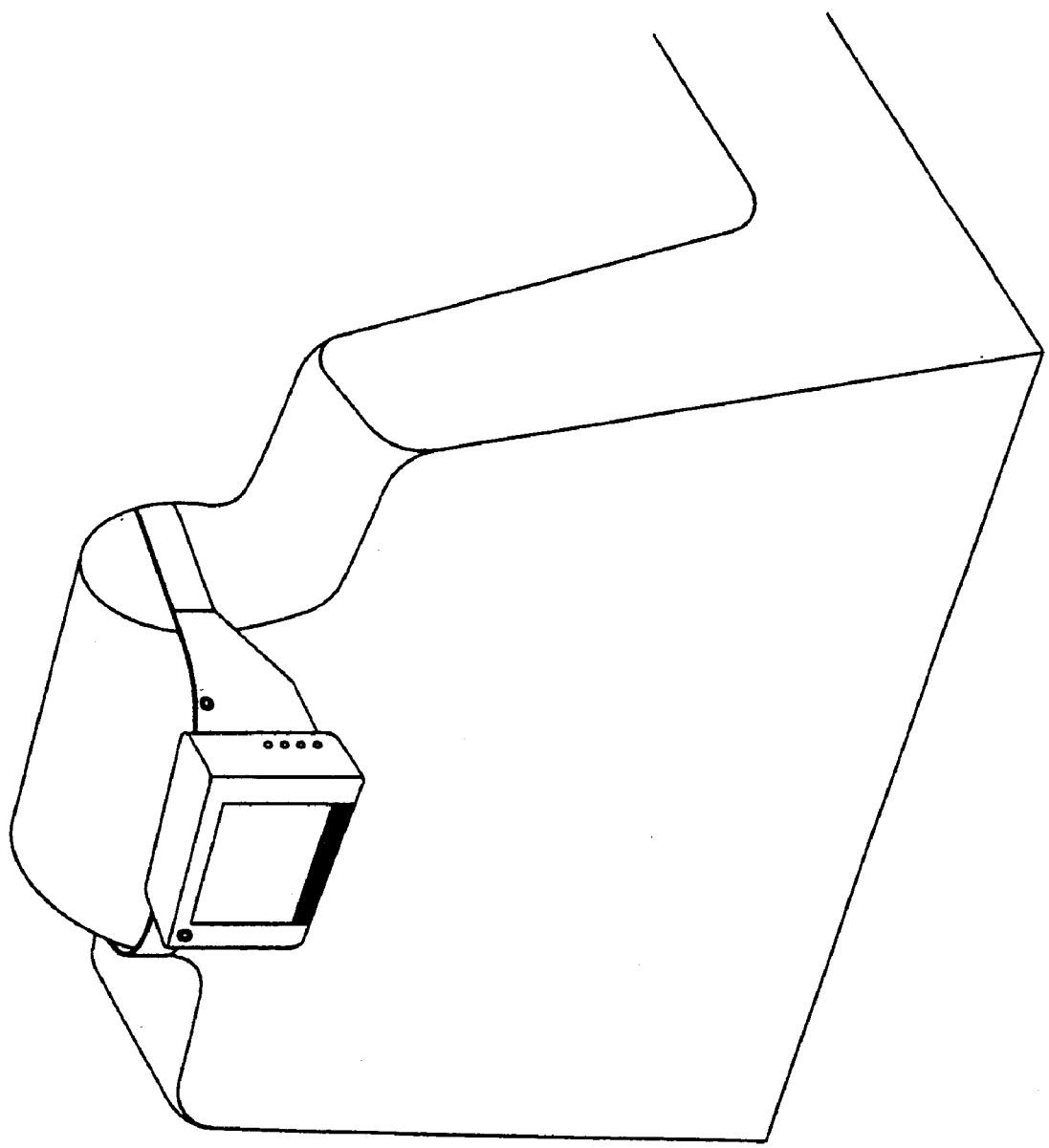
FIG. 4 is a rear perspective view illustrating a portion of the mounting system shown in FIG. 1 attached to a headrest.

In addition to mounting the TV/Monitor inside an upper portion of the principle case, the TV/Monitor may be mounted to the rear of a headrest. FIG. 2 illustrates the TV/Monitor and case and how it attaches to the headrest. The TV/Monitor (16) is secured inside the TV/Monitor case (17) by inserting the TV stand (18) through an elastic strap (19) which is located in the inside rear of the TV/Monitor case. It is further secured by inserting a metal bolt (20) through a metal grommet (21) in the bottom of the TV/Monitor case and threading it into the base of the TV/Monitor. It is further secured by a hook and loop fastener (22). The TV/Monitor case is attached to the rear of a headrest by wrapping the straps (23) around a headrest (as shown in FIG. 4). The strap is secured by an adjustable plastic quick release buckle (24) which allows the strap to be tightened around the headrest.

Figure 5:
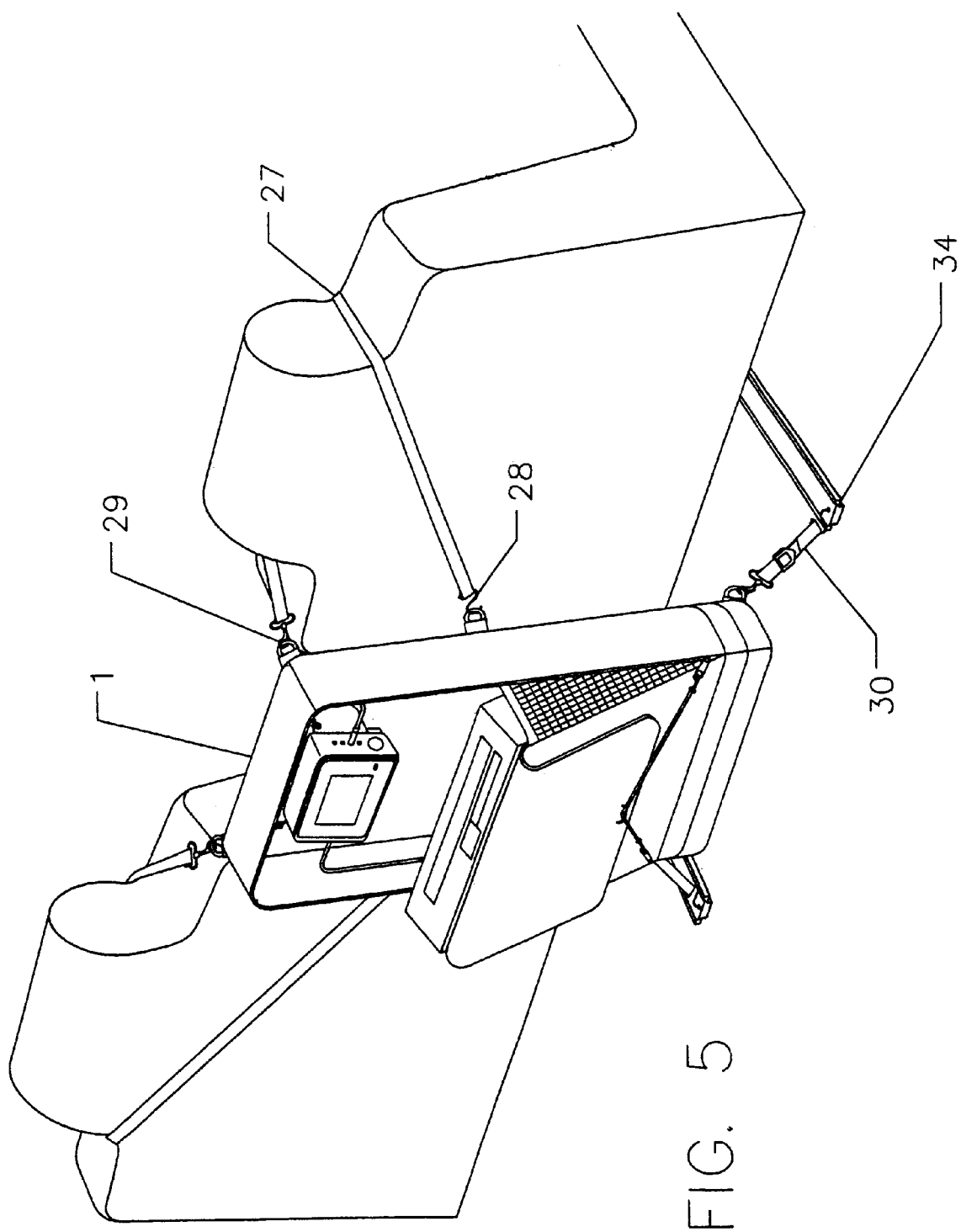
FIG. 5 is a rear perspective view of the mounting system of FIG. 1 secured within an automobile.
Figure 8:
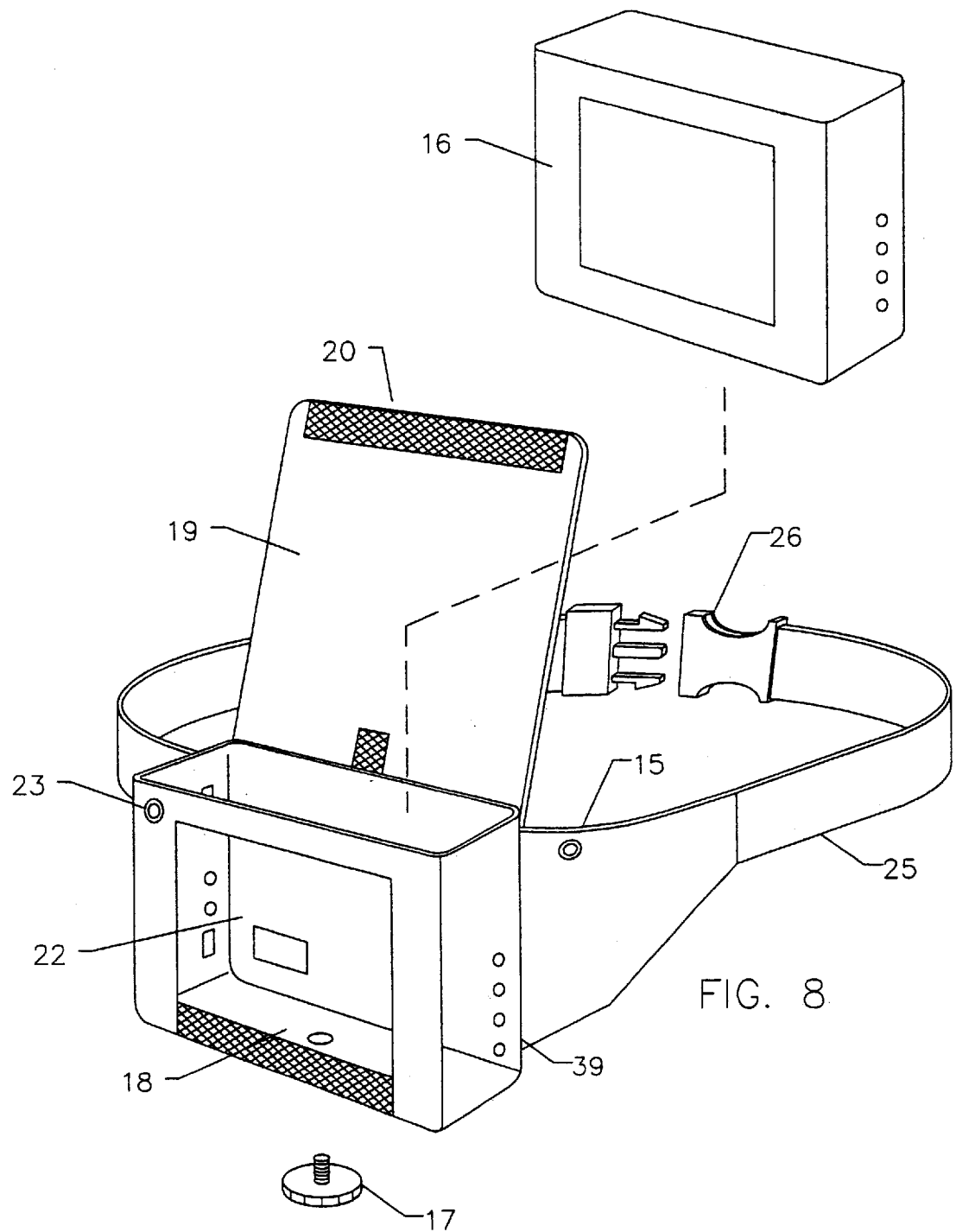
FIG. 8 is a greatly enlarged view of a portion of FIG. 1.

FIG. 5 shows the principle case installed in a vehicle in its open and operational mode. The principle case (1) is mounted to the backside of a seat in the passenger section of a vehicle. The principle case installation is achieved by utilizing four identical adjustable nylon straps, or a first quick connect device, (25). The straps are comprised of a metal S hook (26), a metal quick release fastener (27), and an adjustable buckle (28). Two of these straps are used to attach the top of the case to the headrests, and the other two straps are used to secure the bottom of the case to the seat rails. The principle case has an upper (29), middle (30), and lower (31) metal ring on either side, to which the upper and lower straps are connected. The right side of the case is mounted to the seat by attaching the metal quick disconnect end of a mounting strap to the upper right metal ring of the principle case. It is looped around the headrest, and the S hook end is attached to the middle metal ring of the principle case. Another strap secures the lower section of the principle case by attaching the metal quick release to the lower right metal ring and the S hook to the seat rail (32). The left side of the case is attached similarly. All straps are then tightened by utilizing the adjustable buckle.

FIGS. 6 and 7 show the rear and front views of the principle case and location of the electrical components. The bottom of the principle case has a zippered storage compartment (33) that houses the AC Adapter, AC and DC power cables, and video cables. This compartment also provides a storage area for the mounting straps when not in use. The power cables (AC and DC) (34) exit the storage compartment through one of two flap-covered openings (35) in the rear of the storage compartment. The power and video cables (36) connecting the VCP and TV/Monitor run up and down both sides of the principle case.

The device shown is a portable unit that is designed to safely secure a video player and TV/Monitor inside a vehicle for rear seat viewing in a moving vehicle. Other products on the market are either permanently mounted inside the vehicle or they are combination TV/VCR's that are not designed for use in moving vehicles. The product is designed to entertain passengers in a vehicle, and is also easily removable and can be operated outside of the vehicle on 120 VAC or on batteries.

The basis of this invention is a self contained case that securely houses the TV/Monitor, VCP, and accessories. The TV/Monitor is mounted in a small case which can either be housed inside the principle case or mounted to the back of a headrest. The principle case is mounted in the vehicle by attaching a series of straps to the seats and seat rails. When the case is closed it functions as a storage/carrying case, and when installed in a vehicle it functions as the mounting platform for the video components. Great consideration was given in selecting the materials to provide the maximum level of safety for users of this product. Each component is secured within the principle case with straps and hook and loop fasteners that are both sewn and adhered to components using high temperature and high strength adhesive.

The design of this product is such that it will accommodate upgrades supporting newer technology such as DVD, Video CD, electronic games, GPS, and other electronic devices. It is recommended that all variations of this product be packaged as portable products, and each should be sold with a carrying case that accommodates the product and all its accessories.

What is claimed:

1. A mounting system for releasably and securely mounting an entertainment accessory within an automobile for providing electronically generated images viewable by a person in the automobile, the automobile having first and second headrests extending from at least one seat and having an internal floor, comprising:

an entertainment accessory;

a first case having said entertainment accessory positioned therein by a first element, said first case having a first panel attached proximate to a first edge of said first case, said first panel being outwardly movable to access said entertainment accessory by the person in the automobile, said front panel being capable of covering an upper portion and a lower portion of the first case; and a first quick connect device attached to said first case and adapted to releasably secure said first case to the automobile, said first quick connect device being releasably connected to a location proximate to the internal floor and to both of the first and second headrests.

2. A mounting system for releasably and securely mounting an electronic signal generating device and a display device within an automobile for providing electronically generated images viewable by a person in the automobile, the automobile having first and second headrests extending from at least one seat and having an internal floor, comprising:

a first case having an upper portion, a lower portion, and a first panel attached proximate to a first edge of the first case;

a display device positioned in said upper portion of said first case by a first element;

an electronic signal generating device positioned in said lower portion of said first case for transmitting signals to said display device, said front panel being capable of covering said upper portion and said lower portion of said first case and being outwardly movable to access said electronic signal generating device by the person in the automobile; and a first quick connect device attached to said first case and adapted to releasably secure said first case to the automobile, said first quick connect device being releasably connected to a location proximate to the internal floor and to both of the first and second headrests.

3. The system of claim 2, wherein said front panel is foldable to expose said upper portion of said first case.

4. A system for mounting a video player and a monitor generally behind at least one seat in an automobile to allow a person in the automobile to watch images on the monitor, the automobile having first and second headrests extending from the at least one seat and having an internal floor, the system including:

a soft pack case having a compartment and having a first panel at least partially attachable to the soft pack case by a zipper to permit access to the compartment;

a video player positioned in the compartment and being capable of generating video signals;

a monitor positioned in the compartment by a first element and being capable of receiving video signals from the video player, the first panel of the soft pack case being outwardly movable to access the video player and to view the monitor; and a strapping system attached to the soft pack case, the strapping system being releasably attachable to the first and second headrests extending from the at least one seat and being releasably attachable to a location proximate to the internal floor.

* * * * *

UNITED STATES PATENT AND TRADEMARK OFFICE
CERTIFICATE OF CORRECTION

PATENT NO.    : 6,092,705
DATED         : July 25, 2000
INVENTOR(S)   : Ronald R. Meritt It is certified that error appears in the above-identified patent and that said Letters Patent is hereby corrected as shown below:

Column 7,
Line 56, replace "front" with -- first --;

Column 8,
Lines 22 and 33, replace "front" with -- first --.

Signed and Sealed this

Twentieth Day of May, 2003

JAMES E. ROGAN
*Director of the United States Patent and Trademark Office*